United States Patent
Shiraishi et al.

(10) Patent No.: US 6,891,701 B2
(45) Date of Patent: May 10, 2005

(54) HEAD GIMBAL ASSEMBLY WITH PRECISE POSITIONING ACTUATOR FOR HEAD ELEMENT AND DISK DRIVE APPARATUS WITH THE HEAD GIMBAL ASSEMBLY

(75) Inventors: Masashi Shiraishi, Kwai Chung (HK); Ming Gao Yao, Kwai Chung (HK); Tamon Kasajima, Kwai Chung (HK)

(73) Assignee: Sae Magnetics (H.K.) Ltd., Kwai Chung (CN)

(*) Notice: Subject to any disclaimer, the term of this patent is extended or adjusted under 35 U.S.C. 154(b) by 134 days.

(21) Appl. No.: 10/177,671

(22) Filed: Jun. 24, 2002

(65) Prior Publication Data

US 2003/0147181 A1 Aug. 7, 2003

(30) Foreign Application Priority Data

Feb. 2, 2002 (WO) .............................. PCT/CN02/00053

(51) Int. Cl.[7] .............................................. G11B 5/596
(52) U.S. Cl. ..................................................... 360/294.4
(58) Field of Search ............................ 360/294.4, 234.7; 369/222

(56) References Cited

U.S. PATENT DOCUMENTS

| | | | |
|---|---|---|---|
| 5,745,319 A | 4/1998 | Takekado et al. | 360/78.05 |
| 5,898,541 A | 4/1999 | Boutaghou et al. | 360/294.4 |
| 6,108,175 A | 8/2000 | Hawwa et al. | 360/294.4 |
| 6,611,399 B1 * | 8/2003 | Mei et al. | 360/234.7 |
| 6,690,551 B2 * | 2/2004 | Shiraishi et al. | 360/294.4 |
| 2002/0051326 A1 * | 5/2002 | Shiraishi et al. | 360/294.4 |
| 2002/0097663 A1 * | 7/2002 | O'Neill | 369/222 |
| 2002/0126420 A1 * | 9/2002 | Yao et al. | 360/294.4 |
| 2003/0202292 A1 * | 10/2003 | Arya et al. | 360/294.4 |

FOREIGN PATENT DOCUMENTS

| | | |
|---|---|---|
| JP | 08-180623 | 7/1996 |
| WO | WO98/19304 | 5/1998 |

* cited by examiner

*Primary Examiner*—Tianjie Chen
(74) *Attorney, Agent, or Firm*—Armstrong, Kratz, Quintos, Hanson & Brooks, LLP (57) ABSTRACT

An HGA includes a head slider with at least one head element, a support and a precise positioning actuator fixed with the head slider and with the support for precisely positioning the at least one head element. The actuator includes a pair of movable arms capable of displacing in response to a drive signal applied to the actuator, for catching the head slider in a space between the movable arms. Each of the movable arms includes an arm member being made of an elastic sintered ceramic and having substantially the same cross sectional shape from a root thereof to a top end thereof, and a piezoelectric element formed on a side surface of the arm member. A spacing between base ends of the arm members is larger than a spacing between top ends of the arm members.

10 Claims, 6 Drawing Sheets

Fig. 1

PRIOR ART

HEAD GIMBAL ASSEMBLY WITH PRECISE POSITIONING ACTUATOR FOR HEAD ELEMENT AND DISK DRIVE APPARATUS WITH THE HEAD GIMBAL ASSEMBLY

BACKGROUND OF THE INVENTION

1. Field of the Invention

The present invention relates to a head gimbal assembly (HGA) with a precise positioning actuator for a head element such as a thin-film magnetic head element or an optical head element, and to a disk drive apparatus with the HGA.

2. Description of the Related Art

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk only by a voice coil motor (VCM) has never achieved enough accuracy.

To solve this problem, an additional actuator mechanism is mounted at a position nearer to the magnetic head slider than the VGM so as to perform fine precise positioning that cannot be achieved by the VCM only. The techniques for achieving precise positioning of the magnetic head are described in, for examples, U.S. Pat. No. 5,745,319 and Japanese patent publication No, 08180623 A.

As an example of such additional actuator, there is a piggy-back structure actuator. This piggy-back structure actuator is formed by piezoelectric material of PZT in an I-character shape with one end section to be fixed to a suspension, the other end section to be fixed to a magnetic head slider and a pillar shaped movable arm connected between these end sections. On the suspension, stepwise stacked are the actuator and the magnetic head slider, namely, the actuator is caught between the suspension and the slider to form a stacked cantilever structure.

However, an HGA with such piggy-back structure actuator will have following various problems:

(1) Because of the stepwise stacked structure, a total thickness of the HGA around the magnetic head slider increases by the thickness of the actuator;
(2) The actuator as a whole consists of piezoelectric material such as PZT of a brittle material, and the actuator and the magnetic head slider are stacked to form a cantilever structure. An impact easily occurs with the moment and also shock resistance is very poor;
(3) Depending upon the size of the magnetic head slider, a travel of the magnetic head element during the precise positioning operation varies. Thus, it is difficult to obtain enough stroke;
(4) Because of three-dimensional and complicated attachment structure of the actuator, the handling at the time of an assembly of the HGA is very difficult and it is impossible to use a conventional HGA assembly equipment causing productivity to be very worse; and
(5) In order not to interfere with the movement of the actuator, it is necessary to assemble with keeping a gap between the actuator and the magnetic head slider and also between the actuator and the suspension. However, forming of such gap will more decrease the shock resistance and it is difficult to precisely keep the gap constant. Particularly, since it is difficult to keep the suspension, the actuator and the magnetic head slider in parallel precisely, the head characteristics deteriorates.

In order to solve the aforementioned problems, inventors of this application have proposed an actuator with a structure in which a head slider is caught in a space between a pair of movable arms capable of displacing in response to a drive signal applied thereto. This structure is not publicly known at the time of filing of this application.

Figure 1:
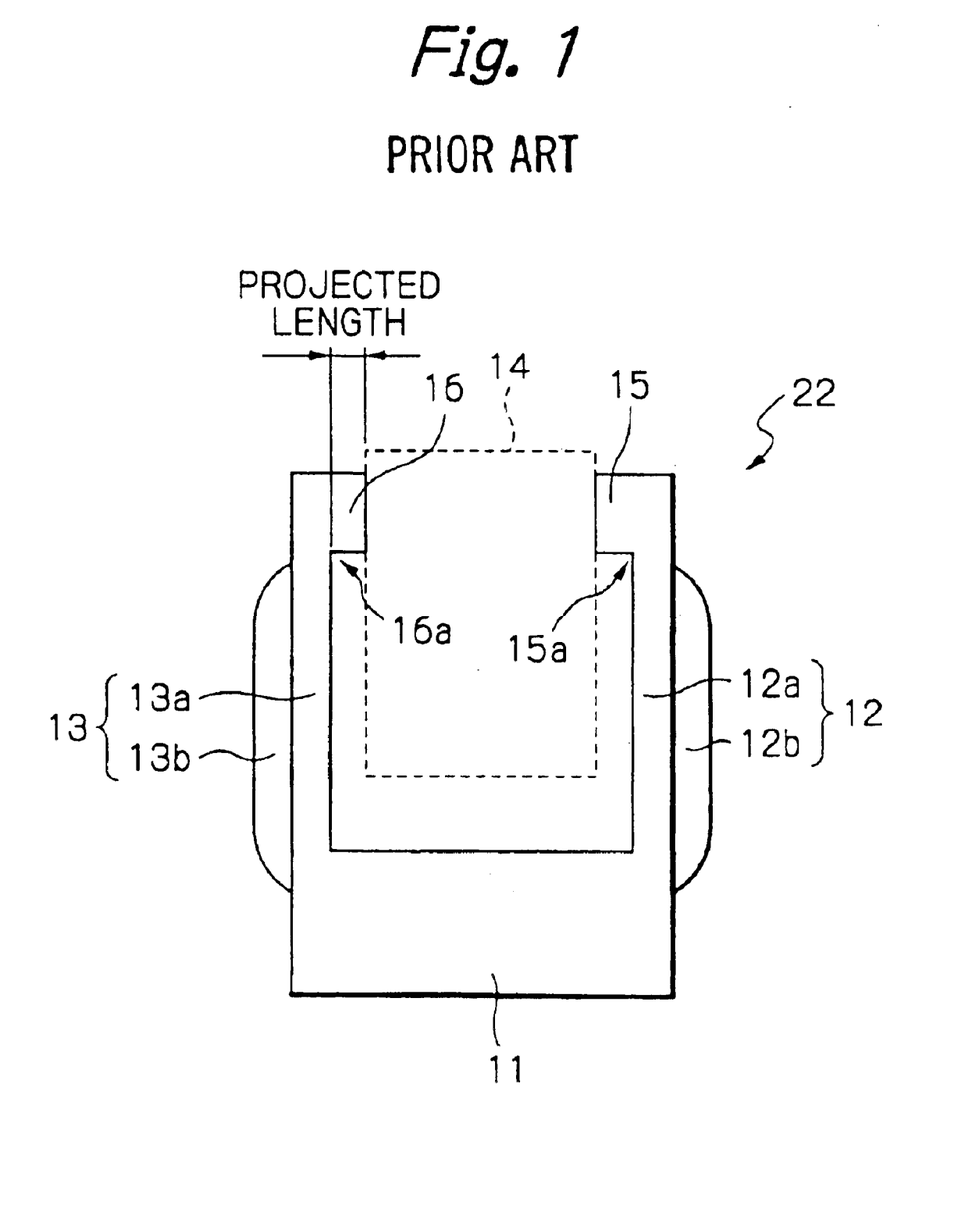
FIG. 1 already described is a plane view illustrating in the structure of the actuator proposed by the inventors prior to this application.

FIG. 1 shows a plane view schematically illustrating the structure of this proposed actuator.

As shown in the figure, the actuator 10 has a rough U-plane shape and consists of a base 11 to be fixed to a suspension and a pair of movable arms 12 and 13 perpendicularly extending from both side ends of the base 11.

At top end sections of the movable arms 12 and 13, formed respectively are slider fixing sections 15 and 16 to be fixed to side surfaces of the magnetic head slider 14. These slider fixing sections 15 and 16 are projected inwardly, namely toward the magnetic head slider 14, so that only these sections 15 and 16 are attached to the side surfaces of the magnetic head slider 14 and that there exists air gaps between the remaining sections of the movable arms 12 and 13 and the side surfaces of the magnetic head slider 14.

The movable arms 12 and 13 consist of arm members 12a and 13a and piezoelectric elements 12b and 13b formed on side surfaces of the arm members 12a and 13a, respectively. The base 11 and the arm members 12a and 13a of the actuator are united by an elastic sintered ceramic.

According to the actuator with such structure, the thickness of the HGA around the magnetic head slider does not increase even if the actuator is attached. Also, since the actuator and the magnetic head slider 14 are not stacked to form a cantilever structure, a shock resistance can be improved. Furthermore, since the magnetic head slider 14 is caught in between the movable arms 12 and 13, it is possible to provide a constant travel to the slider even if the size of the magnetic head slider 14 changes.

However, according to such actuator, since the slider fixing sections 15 and 16 made of the same sintered ceramic were projected inwardly from the surfaces of the movable arms 12 and 13, stress due to applied shock concentrated to corners 15a and 16a at the base of the projections causing these corners to be easily broken. Thus, it was very difficult to greatly improve the shock resistance of the actuator.

SUMMARY OF THE INVENTION

It is therefore an object of the present invention to provide an HGA with a precise positioning actuator for a head element and a disk drive apparatus with the HGA, whereby a shock resistance can be greatly improved.

Another object of the present invention is to provide an HGA with a precise positioning actuator for a head element and a disk drive apparatus with the HGA, whereby quality of the HGA can be greatly improved.

According to the present invention, an HGA includes a head slider with at least one head element, a support and a precise positioning actuator fixed with the head slider and with the support for precisely positioning the at least one head element. The actuator includes a pair of movable arms capable of displacing in response to a drive signal applied to the actuator, for catching the head slider in a space between the movable arms. Each of the movable arms includes an arm member being made of an elastic sintered ceramic and having substantially the same cross sectional shape from a root thereof to a top end thereof, and a piezoelectric element formed on a side surface of the arm member. A spacing between base ends of the arm members is larger than a spacing between top ends of the arm members.

Although the arm members of the movable arms are made of a sintered ceramic, each arm member has substantially the same cross sectional shape from its root to its top end, in other words each arm member is shaped in flat with no level difference. Thus, stress will not converge on specific portion of the arm member when an impactive force is applied to the actuator and therefore shock resistance of the actuator can be remarkably improved. Particularly according to the present invention, the spacing between base ends of the arm members is larger than the spacing between top ends of the arm members. Thus, there exists air gaps between the arm members and the side surfaces of the head slider except for the adhered sections of the arm members and the side surfaces of the head slider resulting that the movement of the actuator can become more free.

Also, since the actuator holds the head slider so that the slider is caught in a space between the pair of movable arms, the thickness of the HGA around the head slider does not increase even if the actuator is attached. Thus, no modifications in size of the disk drive apparatus due to the mounting of the actuator is necessary. Furthermore, since the head slider is caught in between the movable arms, the top end sections of the movable arms which actually transfer the displacement to the slider can be always positioned at the top end of the slider. Thus, it is possible to provide a constant travel to the slider even if the size of the head slider changes, and therefore an enough stroke of the head at the precise positioning operation can be always obtained.

It is preferred that the actuator further includes a base fixed to the support. The movable arms substantially perpendicularly extend from this base.

It is also preferred that the base is made of an elastic sintered ceramic.

It is preferred that the actuator has a rough U-plane shape.

It is further preferred that at least one head element is at least one thin-film magnetic head element.

According to the present invention, also, a disk drive apparatus includes at least one aforementioned HGA.

Further objects and advantages of the present invention will be apparent from the following description of the preferred embodiments of the invention as illustrated in the accompanying drawings.

DESCRIPTION OF THE PREFERRED EMBODIMENTS

Figure 2:
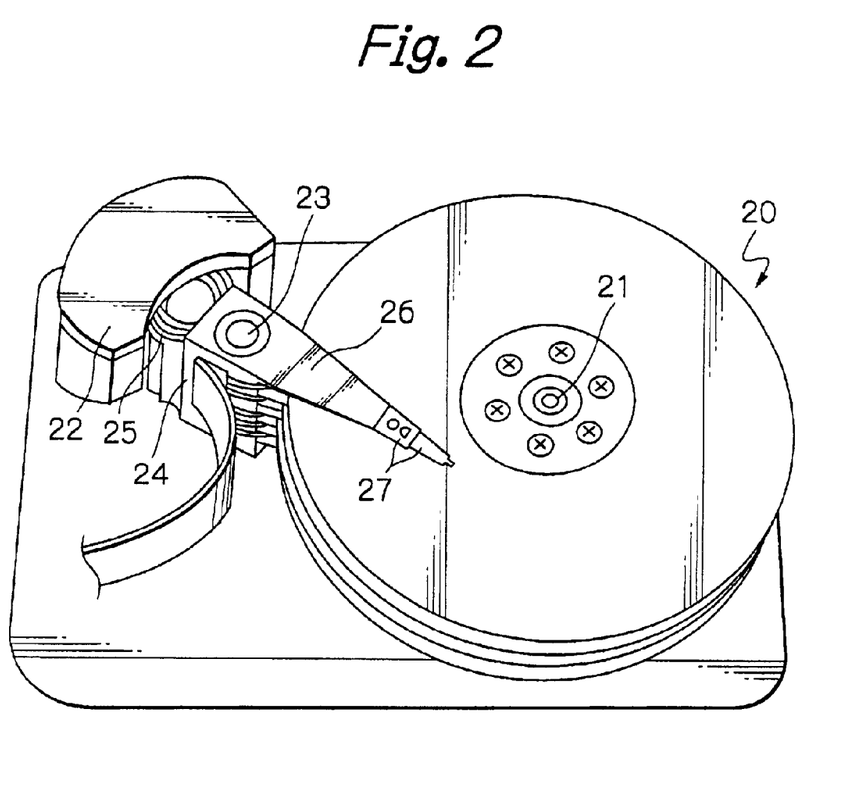
FIG. 2 is an oblique view schematically illustrating main components of a magnetic disk drive apparatus in a preferred embodiment according to the present invention.
Figure 3:
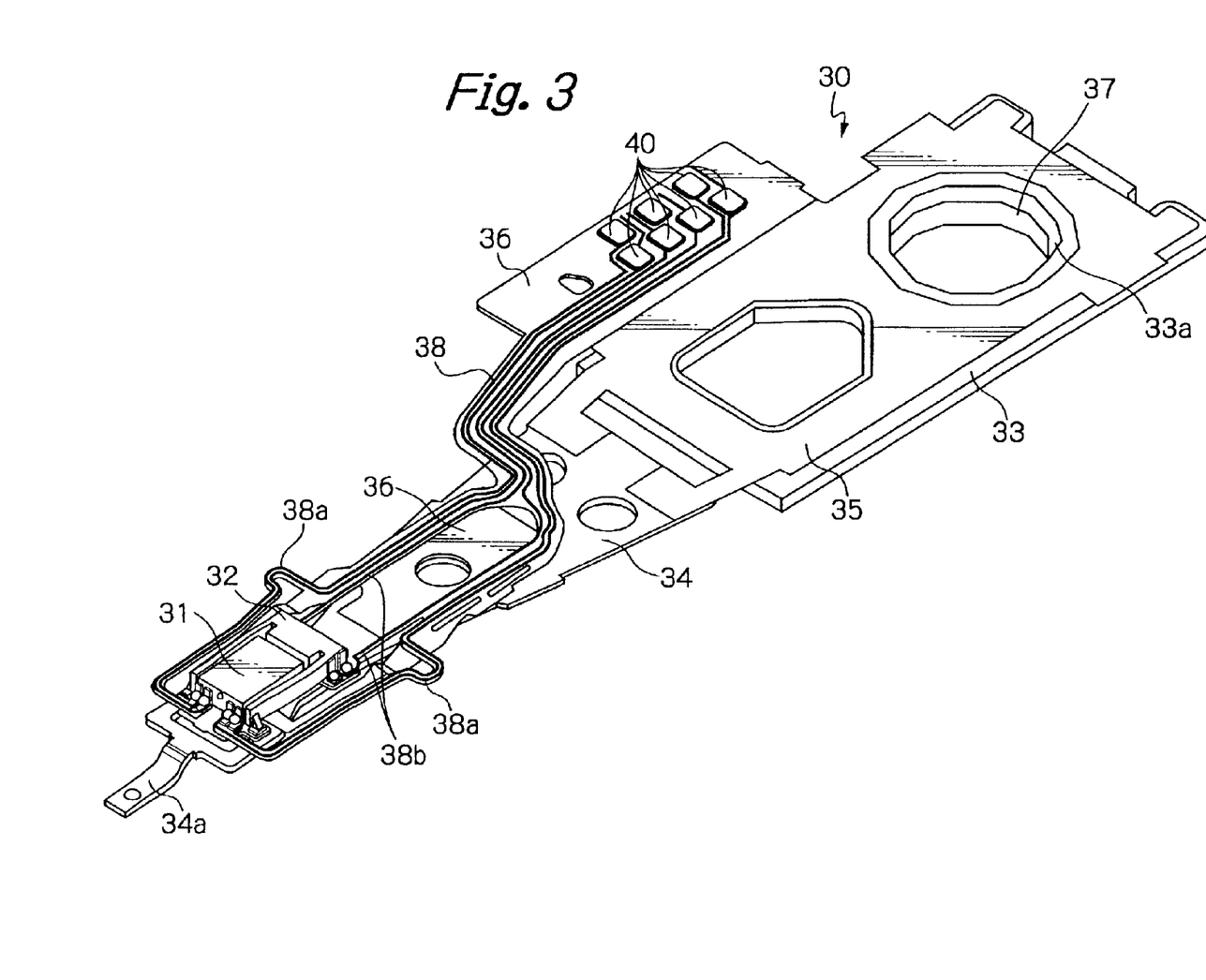
FIG. 3 is an oblique view illustrating the whole structure of an HGA in the embodiment of FIG. 2.
Figure 4:
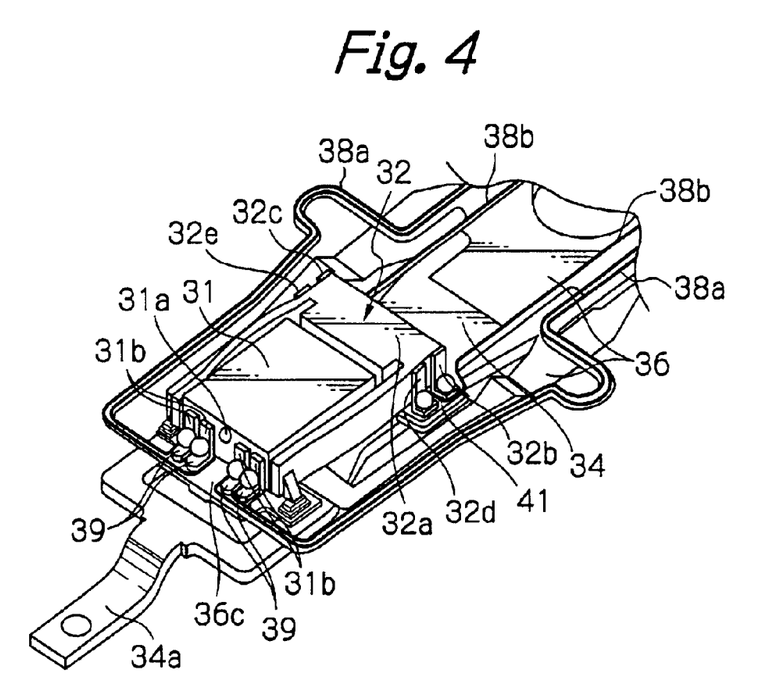
FIG. 4 is an oblique view illustrating a top end section of the HGA in the embodiment of FIG. 2.
Figure 5:
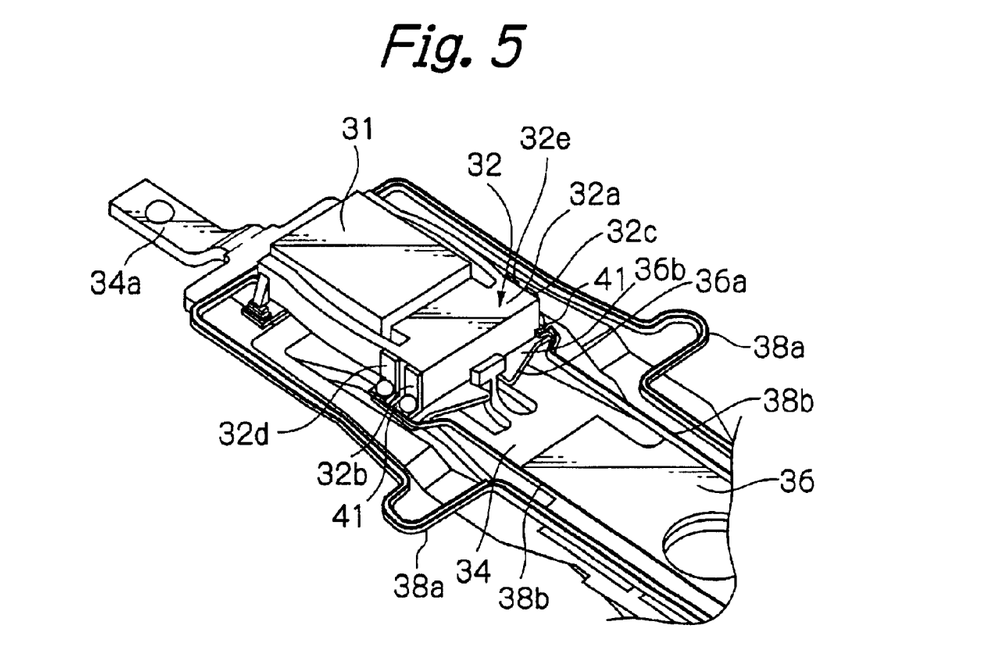
FIG. 5 is an oblique view illustrating the top end section of the HGA in the embodiment of FIG. 2, seen from different direction from that of FIG. 4.

FIG. 2 illustrates main components of a magnetic disk unit of a preferred embodiment according to the present invention, FIG. 3 illustrates the whole structure of an HGA in this embodiment, and FIGS. 4 and 5 illustrate a top end section of the HGA in this embodiment, seen from different directions with each other.

In FIG. 2, reference numeral 20 denotes a plurality of magnetic hard disks rotating around an axis 21, and 22 denotes an assembly carriage device for positioning each magnetic head element on a track of each disk. The assembly carriage device 22 is mainly constituted by a carriage 24 capable of rotating around an axis 23 and a main actuator 25 such as for example a VCM for driving the carriage 24 to rotate.

Base sections at one ends of a plurality of drive arms 26 stacked along the axis 23 are attached to the carriage 24, and one or two HGAs 27 are mounted on a top section at the other end of each arm 26. Each of the HGAs 27 has a slider mounted at its top end section so that the slider opposes to one surface (recording and reproducing surface) of each of the magnetic disks 20.

As shown in FIGS. 3 to 5, the HGA is assembled by fixing a fine tracking actuator 32 for precise positioning of a thin-film magnetic head element to a top end section of a suspension 30. The actuator 32 holds side surfaces of a magnetic head slider 31 with the thin-film magnetic head element so that the slider 31 is caught in a space between its movable arms.

A main or course actuator of VCM 25 shown in FIG. 2 is used for rotationally moving the drive arm 26 to which such HGA 27 is attached, so as to move the whole assembly. The actuator 32 contributes the fine positioning of the HGA, which cannot be adjusted by the main or course actuator 25.

The suspension 30 is substantially formed, as shown in FIGS. 3 to 5, by first and second load beams 33 and 34, a resilient hinge 35 coupled with both these first and second load beams 33 and 34, a resilient flexure 36 fixed on the second load beam 34 and the hinge 35, and a circular base plate 37 formed at an attaching section 33a of the first load beam 33.

The flexure 36 has a flexible tongue 36a depressed by a dimple (not shown) formed on the second load beam 34 at its one end section. On the tongue 36a, fixed is a base section 32a of the actuator 32 via an insulation layer 36b made of for example polyimide.

The flexure 36 has elasticity for supporting flexibly the magnetic head slider 31 through the actuator 32 by this tongue 36a. The flexure 36 is made of in this embodiment a stainless steel plate (for example SUS304TA) with a thickness of about 20 $\mu$m. The flexure 36 is fixed with the second load beam 34 and with the hinge 35 at a plurality of points by pinpoint welding.

The hinge 35 has elasticity providing, to the second load beam 34, a force for pressing the magnetic head slider 31 toward the direction of a magnetic disk surface through the actuator 32 in operation. The hinge 35 is made of in this embodiment a stainless steel plate with a thickness of about 40 μm.

The first load beam 33 is made of in this embodiment a stainless steel plate with a thickness of about 100 μm, and supports the whole surface of the hinge 35. The fixing of the first load beam 33 with the hinge 35 is performed by pinpoint welding at a plurality of points. The second load beam 34 is also made of in this embodiment a stainless steel plate with a thickness of about 100 μm, and fixed to the hinge 35 at its rear end section. The fixing of the second load beam 34 with the hinge 35 is performed also by pinpoint welding at a plurality of points. At a top end of this second load beam 34, formed is a lift-tab 34a for separating the HGA from the magnetic-disk surface during out of operation is prepared.

The base plate 37 to be attached to the drive arm 26 shown in FIG. 2 is made of in this embodiment a stainless steel or iron plate with a thickness of about 150 μm. This base plate 37 is fixed to the attaching section 33a of the first load beam 33 by welding.

On the flexure 36, a flexible conductor member 38 including a plurality of trace conductors of a thin-film multi-layered pattern is formed or disposed. The conductor member 38 is formed by a known method similar to the patterning method of forming a printed circuit board on a thin metal plate such as a flexible printed circuit (FPC). For example, the member 38 is formed by sequentially depositing a first insulation material layer made of a resin such as polylmide with a thickness of about 5 μm, a patterned Cu layer (trace conductor layer) with a thickness of about 4 μm, and a second insulation material layer made of a resin such as polyimide with a thickness of about 5 μm on the flexure 36 in this order. Within the regions of the connection pads formed for connecting with the actuator, the magnetic head element and an external circuit, an Au layer is deposited on the Cu layer and there is no second insulation material layer on the Au layer.

In this embodiment, the conductor member 38 consists of a first conductor member 38a with two trace conductors connected to the magnetic head element for one side, thus four trace conductors for both sides, and a second conductor member 38b with a trace conductor connected to the actuator 32 for one side, thus two trace conductors for both sides.

One end of the trace conductors of the first conductor member 38a is electrically connected to head element connection pads 39 formed on an individually separated and freely movable section 36c of the flexure 36. The connection pads 39 are ball-bonded to terminal electrodes 31a of the magnetic head slider 31 by Au bonding, wire bonding or stitch bonding. The other end of the trace conductors of the first conductor member 38a is electrically connected to external circuit connection pads 40 used for connection with an external circuit.

One end of trace conductors of the second conductor member 38b is electrically connected to actuator connection pads 34 formed on an insulation layer 36b on the tongue 36a of the flexure 36. The connection pads 41 are connected to A channel and B channel signal terminals 32b and 32c formed on a base 32a of the actuator 32, respectively. The other end of trace conductors of the second conductor member 38b is electrically connected to the external circuit connection pads 40.

A structure of the HGA according to the present invention is not limited to the aforementioned structure. Furthermore, although it is not shown, a head drive IC chip may be mounted on a middle of the suspension 30.

Figure 6:
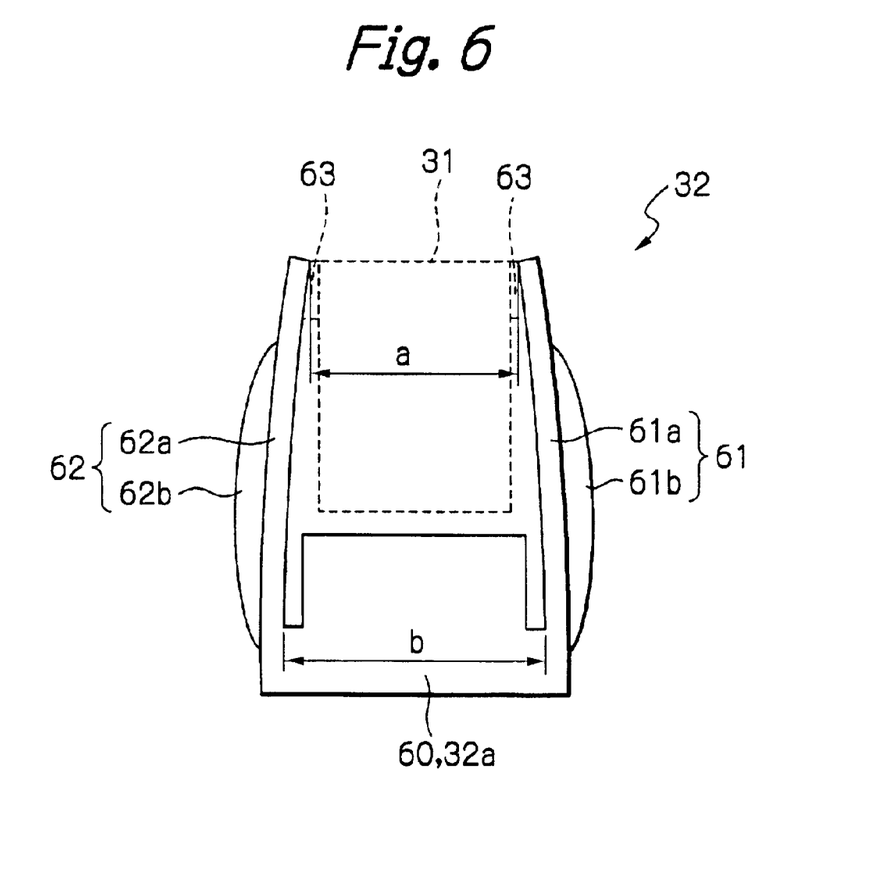
FIG. 6 is a plane view illustrating a structure of an actuator in the embodiment of FIG. 2.
Figure 7:
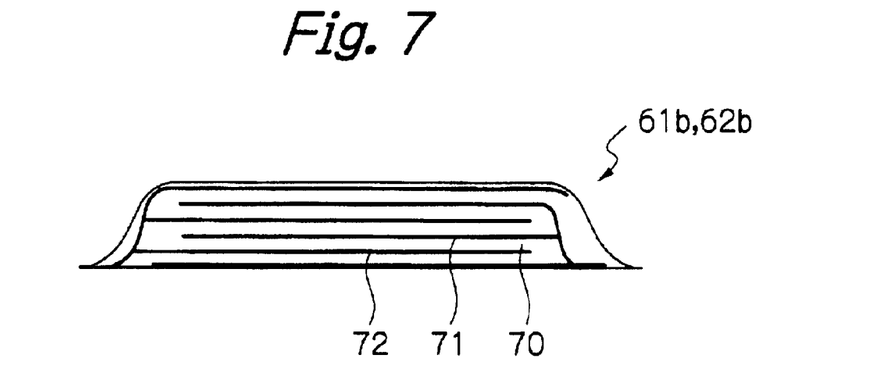
FIG. 7 is a sectional view illustrating a structure of a piezoelectric element section of the actuator shown in FIG. 6.

FIG. 6 illustrates a structure of the actuator 32 in the embodiment of FIG. 2, and FIG. 7 illustrates a structure of a piezoelectric element section of the actuator 32.

As will be noted from FIG. 6, the actuator 32 has a rough U-plane shape and consists of a base 60 (32a) to be fixed to a suspension and a pair of movable arms 61 and 62 perpendicularly extending from both side ends of the base 60. The movable arms 61 and 62 consist of arm members 61a and 62a and piezoelectric elements 61b and 62b formed on side surfaces of the arm members 61a and 62a, respectively.

The base 60 and the arm members 61a and 62a of the actuator 62 are united by an elastic sintered ceramic. Since the main sections of the actuator are made of the elastic sintered ceramic that is strong for bending, a shock resistance of the actuator itself increases.

It is important in this embodiment that the shape of each of the arm members 61a and 62a is flat without a level difference from its root coupled with the base 60 to its top end so as to have substantially the same cross section, and that a spacing b between base ends of the arm members 61a and 62a is larger than a spacing a between top ends of the arm members 61a and 62a.

The magnetic head slider 31 is caught between the top end sections of these flat arm members 61a and 62a and fixed to the flat arm members using adhesive 63. As aforementioned, the spacing b between the base ends of the arm members 61a and 62a is determined to a value larger than the spacing a between the top ends of the arm members 61a and 62a (b>a). Since the arm members 61a and 62a are shaped in flat and b>a, when assembling with the magnetic head slider 31, it is necessary to deform the arm members 61a and 62a such that their interval will narrow toward their top end sections. Thus, only the top end sections of the arm members 61a and 62a are adhered to the side surfaces of the magnetic head slider 31 and there exists air gaps between the remaining sections of the arm members 61a and 62a and the side surfaces of the magnetic head slider 31. As a result, the movable arms 61 and 62 will not contact the magnetic head slider 31 to limit the movement of the actuator 32 in operation except for the adhered regions 63.

A thickness of the actuator 32 is determined to a value equal to or thinner less than that of the magnetic head slider to be held so that the total thickness of the HGA will not increase due to the mounting of the actuator. Conversely, by thickening the actuator 32 up to the thickness of the magnetic head slider to be held, strength of the actuator itself can be increased without increasing the total thickness of the HGA.

Each of the piezoelectric elements 61b and 62b has, as shown in FIG. 7, a multi-layered structure of alternately laminating piezoelectric material layers 70, signal electrode layers 71 and ground (common) electrode layers 72. By applying voltage across the signal electrode layers 71 and the ground (common) layers 72, the piezoelectric material layers 70 expand and contract. The piezoelectric material layer 70 is made of material that expands and contracts by reverse piezoelectric effect or by electrostrictive effect. The signal electrode layers 71 are electrically connected to the A channel signal terminal 32b or the B channel signal terminal 32c, and the ground (common) electrode layers 72 are electrically connected to ground (common) terminal 32d or 32e, shown in FIGS. 4 and 5.

In case that the layers 70 are made of piezoelectric material such as PZT (Lead Zirconate Titanate Oxidization), these piezoelectric material layers are in general polarized so as to improve their displacement performance. The polarized direction is the lamination direction of the piezoelectric material layers 70. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element 61b or 62b, the piezoelectric element contracts or expands in response to the applied voltage polarity and thus the movable arm 61 or 62 bends to trace a S-character resulting the top end section of the arm 61 or 62 to laterally and linearly displace. Thus, the magnetic head slider 31 fixed with the actuator 32 also laterally and linearly displaces. Since the slider displaces namely oscillates with linear motion not swinging or rotational motion, more precise positioning of the magnetic head element can be expected.

It is possible to apply voltages that induce mutually reverse motions may be simultaneously applied to the piezoelectric elements 61b and 62b, respectively. In other words, AC voltages may be simultaneously applied to the piezoelectric elements 61b and 62b so that one piezoelectric element expands when the other piezoelectric element contracts and vice versa. The oscillation of the movable arms is centered when no voltage is applied to the piezoelectric elements. In this case, the stroke of the movable arms become twice of that when the same voltage is alternately applied to the piezoelectric elements 61b and 62b. However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as PZT[Pb(Zr,Ti)O$_3$], PT(PbTiO$_3$), PLZT[(Pb,La)(Zr,Ti)O$_3$], or barium titanate (BaTiO$_3$).

As aforementioned, since the actuator 32 in this embodiment has the arm members 61a and 62a of the movable arms 61 and 62 shaped in flat with no level difference, stress will not converge on specific portions of the arm members when an impactive force is applied to the HGA. Thus, shock resistance of the actuator and also of the HGA can be remarkably improved.

Figure 8:
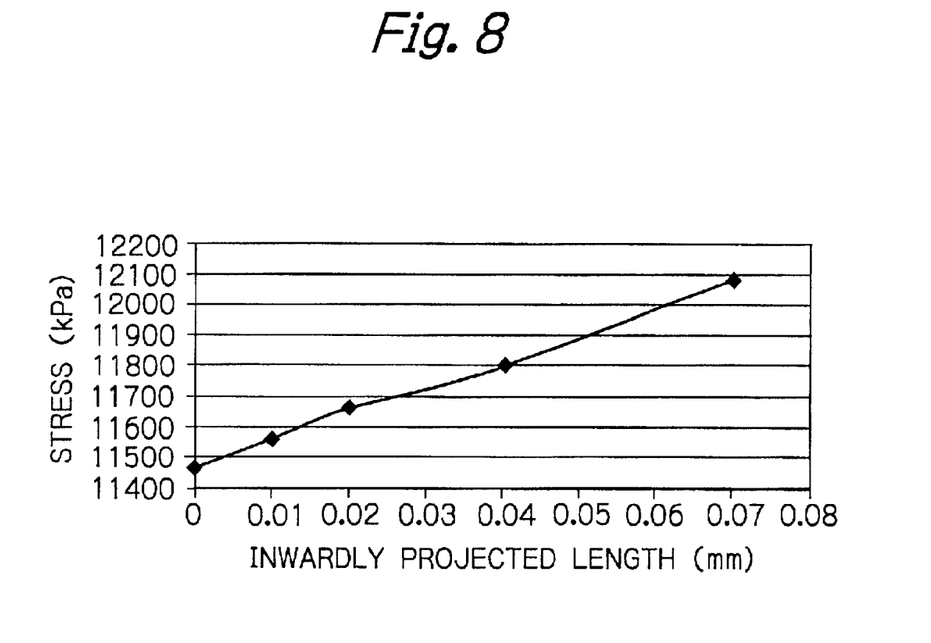
FIG. 8 illustrates a simulation result of stress characteristics at the base of a projection of each arm member of the actuator with respect to an inwardly projected length of the projection.
Figure 9:
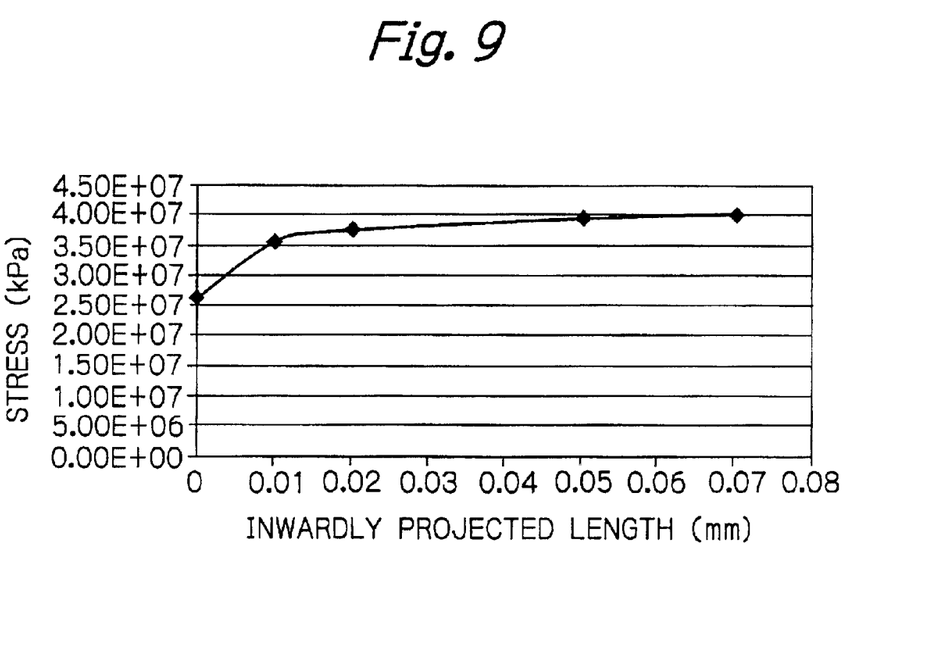
FIG. 9 illustrates a simulation result of stress characteristics at the base of the projection of each arm member of the actuator with respect to an inwardly projected length of the projection.

FIG. 8 illustrates a simulation result of stress produced at the base of a projection formed at the top end section of each arm member of the actuator with respect to various inwardly projected lengths of the projection or various lengths of the projection toward the magnetic head slider when an impactive force of 1 G is applied to the actuator shown in FIG. 1, that is not driven, and FIG. 9 illustrates a simulation result of stress produced at the base of a projection formed at the top end section of each arm member of the actuator with respect to various inwardly projected lengths of the projection when the actuator shown in FIG. 1 is driven by the driving voltage.

It will be apparent from these figures that the stress produced at the base of the projection formed at the top end section of the arm member becomes the minimum and thus destruction of the arm member will hardly occur if the projected length of the projection is zero in other words if the arm member is shaped in flat with no level difference.

Also, since the actuator 32 in this embodiment holds the side surfaces of the magnetic head slider 31 so that the slider 31 is caught in a space between the movable arms 61 and 62, the thickness of the HGA around the magnetic head slider does not increase even if the actuator 32 is attached. Thus, no modifications in size of the magnetic disk drive apparatus due to the mounting of the actuator is necessary. Also, since the actuator 32 and the magnetic head slider 31 are not stacked to form a cantilever structure, the shock resistance can be further improved. Furthermore, since the magnetic head slider 31 is caught in between the movable arms 61 and 62, the top end sections of the movable arms 61 and 62, which actually transfer the displacement to the slider 31, can be always positioned at the top end of the slider 31. Thus, it is possible to provide a constant travel to the slider even if the size of the magnetic head slider 31 changes, and therefore an enough stroke of the magnetic head at the precise positioning operation can be always obtained.

In the aforementioned embodiment, the precise positioning actuators for the thin-film magnetic head element and the HGA with the actuator is described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly including a head slider with at least one head element, a support and a precise positioning actuator fixed with said head slider and with said support for precisely positioning said at least one head element, said actuator including a pair of movable arms capable of displacing in response to a drive signal applied to said actuator, for catching said head slider in a space between said movable arms, each of said movable arms being made of an elastic sintered ceramic and having substantially the same cross sectional shape from a root thereof to a top end thereof which contacts said head slider, and a piezoelectric element formed on a side surface of each said arm, a spacing between base ends of said arms being larger than a spacing between top ends of said arms.

2. The head gimbal assembly as claimed in claim 1, wherein said actuator further comprises a base fixed to said support, said movable arms substantially perpendicularly extending from said base.

3. The head gimbal assembly as claimed in claim 2, wherein said base is made of an elastic sintered ceramic.

4. The head gimbal assembly as claimed in claim 1, wherein said actuator has a rough U-plane shape.

5. The head gimbal assembly as claimed in claim 1, wherein said at least one head element is at least one thin-film magnetic head element.

6. A disk drive apparatus having at least one head gimbal assembly that includes a head slider with at least one head element, a support and a precise positioning actuator fixed with said head slider and with said support for precisely positioning said at least one head element, said actuator including a pair of movable arms capable of displacing in response to a drive signal applied to said actuator, for catching said head slider in a space between said movable arms, each of said movable arms being made of an elastic sintered ceramic and having substantially the same cross sectional shape from a root thereof to a top end thereof which contacts said head slider, and a piezoelectric element formed on a side surface of each said arm, a spacing between base ends of said arms being larger than a spacing between top ends of said arms.

7. The disk drive apparatus as claimed in claim 6, wherein said actuator further comprises a base fixed to said support, said movable arms substantially perpendicularly extending from said base.

8. The disk drive apparatus as claimed in claim 7, wherein said base is made of an elastic sintered ceramic.

9. The disk drive apparatus as claimed in claim 6, wherein said actuator has a rough U-plane shape.

10. The disk drive apparatus as claimed in claim 6, wherein said at least one head element is at least one thin-film magnetic head element.

\* \* \* \* \*

UNITED STATES PATENT AND TRADEMARK OFFICE
CERTIFICATE OF CORRECTION

PATENT NO. : 6,891,701 B2
DATED : May 10, 2005
INVENTOR(S) : Shiraishi et al.

It is certified that error appears in the above-identified patent and that said Letters Patent is hereby corrected as shown below:

<u>Title page,</u>
Item [73], change "Assignee: Sae Magnetics (H.K.) Ltd., Kwai Chung (CN)" to be
-- Assignee: SAE Magnetics (H.K.) Ltd., Kwai Chung (CN) --.

Signed and Sealed this

Sixth Day of September, 2005

JON W. DUDAS
*Director of the United States Patent and Trademark Office*